United States Patent
Boehm et al.

(10) Patent No.: US 10,534,590 B2
(45) Date of Patent: *Jan. 14, 2020

(54) DYNAMIC RECOMPILATION TECHNIQUES FOR MACHINE LEARNING PROGRAMS

(71) Applicant: International Business Machines Corporation, Armonk, NY (US)

(72) Inventors: Matthias Boehm, San Jose, CA (US); Berthold Reinwald, San Jose, CA (US); Shirish Tatikonda, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/581,456

(22) Filed: Apr. 28, 2017

(65) Prior Publication Data
US 2017/0228222 A1 Aug. 10, 2017

Related U.S. Application Data

(63) Continuation of application No. 14/974,295, filed on Dec. 18, 2015, now Pat. No. 9,715,373.

(51) Int. Cl.
*G06F 8/41* (2018.01)

(52) U.S. Cl.
CPC .................................... *G06F 8/41* (2013.01)

(58) Field of Classification Search
None
See application file for complete search history.

(56) References Cited

U.S. PATENT DOCUMENTS

| | | | |
|---|---|---|---|
| 6,668,257 B1 * | 12/2003 | Greef | G06F 9/4493 |
| 7,831,593 B2 | 11/2010 | Burger et al. | |
| 2007/0226186 A1 | 9/2007 | Ewen et al. | |
| 2009/0083676 A1 * | 3/2009 | Flanagan | G06F 3/0481 |
| | | | 715/853 |

(Continued)

FOREIGN PATENT DOCUMENTS

EP        723239        9/2001

OTHER PUBLICATIONS

List of IBM Patents or Applications Treated as Related, Apr. 2017.

*Primary Examiner* — Daxin Wu
(74) *Attorney, Agent, or Firm* — Lieberman & Brandsdorfer, LLC

(57) ABSTRACT

The embodiments described herein relate to recompiling an execution plan of a machine-learning program during runtime. An execution plan of a machine-learning program is compiled. In response to identifying a directed acyclic graph of high-level operations (HOP DAG) for recompilation during runtime, the execution plan is dynamically recompiled. The dynamic recompilation includes updating statistics and dynamically rewriting one or more operators of the identified HOP DAG, recomputing memory estimates of operators of the rewritten HOP DAG based on the updated statistics and rewritten operators, constructing a directed acyclic graph of low-level operations (LOP DAG) corresponding to the rewritten HOP DAG based in part on the recomputed memory estimates, and generating runtime instructions based on the LOP DAG.

20 Claims, 8 Drawing Sheets

(56) References Cited

U.S. PATENT DOCUMENTS

2011/0276789 A1    11/2011  Chambers et al.
2012/0226639 A1*    9/2012  Burdick .................. G06F 8/427
                                                    706/12
2013/0346988 A1*   12/2013  Bruno ................... G06F 9/5066
                                                    718/102

* cited by examiner

DYNAMIC RECOMPILATION TECHNIQUES FOR MACHINE LEARNING PROGRAMS

CROSS REFERENCE TO RELATED APPLICATION(S)

This application is a continuation patent application claiming the benefit of the filing date of U.S. patent application Ser. No. 14/974,295 filed on Dec. 18, 2015 and titled "Dynamic Recompilation Techniques for Machine Learning Programs", now pending, which is hereby incorporated by reference.

BACKGROUND

The embodiments described herein relate to machine learning programs. More specifically, the embodiments relate to execution plan recompilation of machine learning programs.

Machine learning (ML) is a type of artificial intelligence (AI) that provides computers with the ability to learn without being explicitly programmed. Declarative ML aims at a flexible specification of ML algorithms in a high-level language, independent of data characteristics and automatic generation of efficient execution plans. In order to provide efficiency and scalability, hybrid runtime execution plans are compiled, ranging from in-memory single node execution to distributed Map Reduce (MR) or Spark computation and data access. This allows for the compilation of highly efficient execution plans based on data and cluster characteristics. However, during runtime, the compilation of an execution plan may be determined to be inefficient due to basing execution plans on inferences associated with data size and sparsity of intermediate results, initially unknown or changing characteristics.

SUMMARY

The embodiments comprise a method, computer program product, and system for dynamically re-compiling execution plans of a machine-learning program during runtime.

According to one aspect, a method is provided for re-compiling an execution plan of a machine-learning program during runtime. An execution plan of a machine-learning program is compiled. The compilation includes parsing an input script of a machine-learning program, converting the parsed script into one or more directed acyclic graphs of high-level operators (HOP DAG), and constructing one or more directed acyclic graphs of low-level operators (LOP DAGs) corresponding to respective HOP DAGs. In response to identifying a HOP DAG for re-compilation during runtime, the execution plan is dynamically re-compiled. The dynamic re-compilation includes updating statistics and dynamically re-writing one or more operators of the identified HOP DAG, re-computing memory estimates of operators of the rewritten HOP DAG based on the updated statistics and re-written operators, constructing a re-written LOP DAG corresponding to the re-written HOP DAG based in part on the re-computed memory estimates, and generating runtime instructions based on the re-written LOP DAG.

According to another aspect, a computer program product is provided to re-compile an execution plan of a machine-learning program during runtime. The computer program product includes a computer readable storage device having computer readable code embodied therewith. The program code is executable by a processor to compile an execution plan of a machine-learning program. The compilation includes parsing an input script of a machine-learning program, converting the parsed script into one or more directed acyclic graphs of high-level operators (HOP DAG), and constructing one or more directed acyclic graphs of low-level operators (LOP DAGs) corresponding to respective HOP DAGs. In response to identifying a HOP DAG for re-compilation during runtime, program code dynamically re-compiles the execution plan. The dynamic re-compilation includes updating statistics and dynamically re-writing one or more operators of the identified HOP DAG, re-computing memory estimates of operators of the rewritten HOP DAG based on the updated statistics and re-written operators, constructing a re-written LOP DAG corresponding to the re-written HOP DAG based in part on the recomputed memory estimates, and generating runtime instructions based on the rewritten LOP DAG.

According to yet another aspect, a system is provided to re-compile an execution plan of a machine-learning program during run time. The system includes a processing unit is in communication with memory. A functional unit is in communication with the processing unit. The functional unit compiles an execution plan of a machine-learning program. The compilation includes parsing an input script of a machine-learning program, converting the parsed script into one or more directed acyclic graphs of high-level operators (HOP DAG), and constructing one or more directed acyclic graphs of low-level operators (LOP DAGs) corresponding to respective HOP DAGs. In response to identifying a HOP DAG for re-compilation during runtime, the functional unit dynamically re-compiles the execution plan. The dynamic re-compilation includes updating statistics and dynamically re-writing one or more operators of the identified HOP DAG, re-computing memory estimates of operators of the rewritten HOP DAG based on the updated statistics and re-written operators, constructing a re-written LOP DAG corresponding to the re-written HOP DAG based in part on the recomputed memory estimates, and generating runtime instructions based on the rewritten LOP DAG.

Other features and advantages of this invention will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
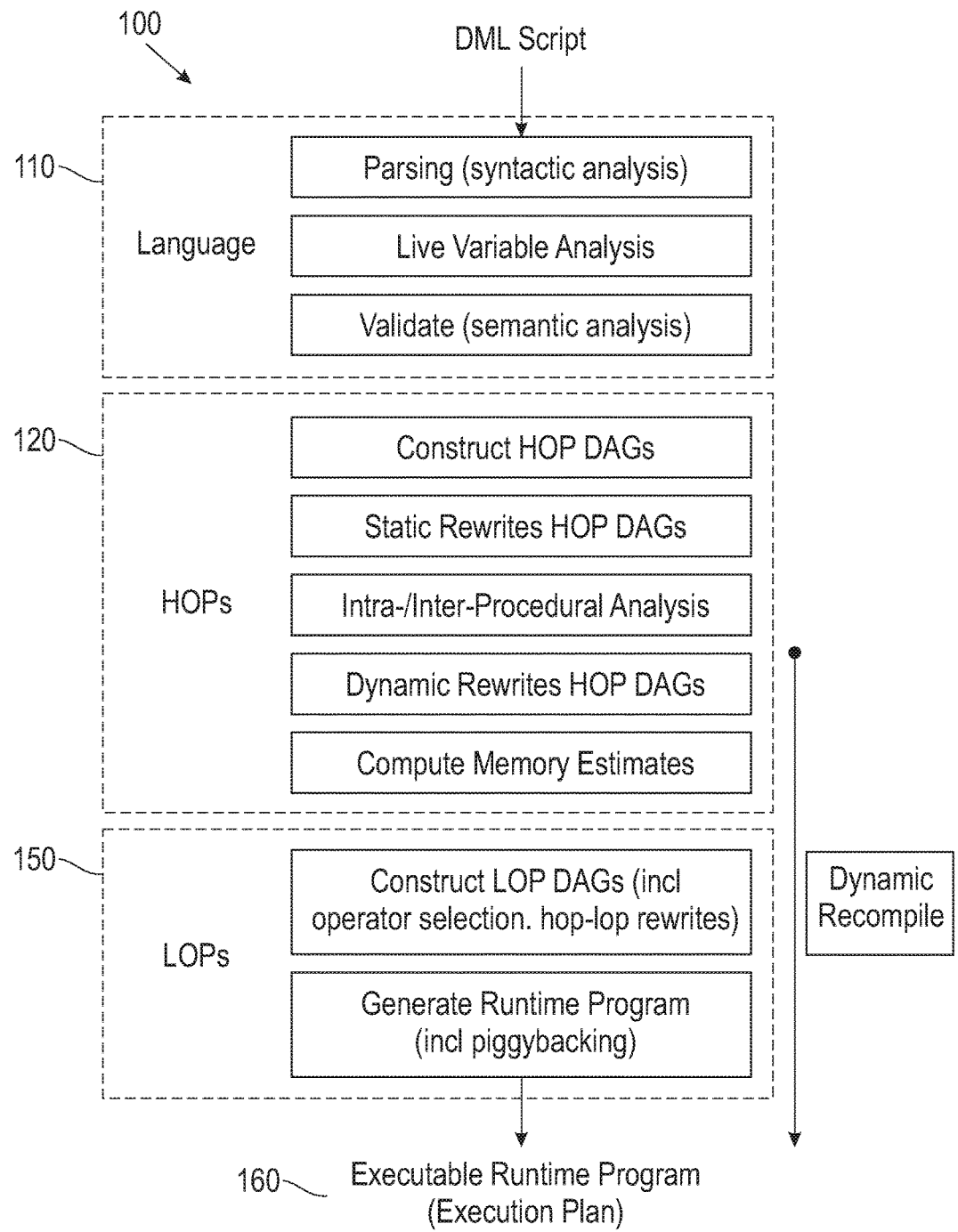
FIG. 1 depicts a block diagram illustrating system architecture for performing execution plan compilation.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Referring to FIG. 1, a block diagram (100) is provided illustrating the system architecture. As shown, the overall system machine learning (System ML) architecture has different layers. The language layer (110) contains a rich set of statistical functions, linear algebra operations, control structures, user-defined and external functions, recursion, and machine language specific operations. The parser produces directed acyclic graphs (DAGs) of high level operators (HOPs), shown in a separate second layer (120), per block of statements as defined by control structures. Each HOP DAG is composed of nodes and edges, with the nodes associated with high-level (logical) operators, and the edges associated with data dependencies. HOPs, such as matrix multiplication, unary and binary operations, or reorg operations, operate on intermediates of matrices and scalars. Various optimizations are applied on HOP DAGs, including operator ordering and selection. Operator selection is significant as the runtime supports for expensive operations, such as matrix multiplication, are chosen depending on data and cluster characteristics.

HOP DAGs are transformed to low-level operator (LOP) DAGs, as shown as a separate layer (150). Each LOP DAG is composed of nodes and edges, with the nodes associated with low-level (logical) operators, and the edges associated with data dependencies. Low-level operators, such as grouping, aggregate, transform, or binary operations, operate on runtime specific intermediates, such as key-value pairs in MapReduce (MR). Given assigned LOP execution types, the LOPs of a DAG are piggybacked into a workflow of MR jobs in order to minimize data scans for operator pipelining and latency reduction. LOPs have equivalent runtime implementations (160), i.e. runtime instructions, which are either executed in-memory of a single node control program or on MapReduce or other distributed runtime frameworks such as Spark. Accordingly, an executable runtime program, or execution plan, may be compiled by utilizing a well defined "compilation chain," with the compilation chain including the language-level layer, the high-level operator (HOP)-level layer, the low-level operator (LOP)-level layer, and the runtime layer.

Figure 2:
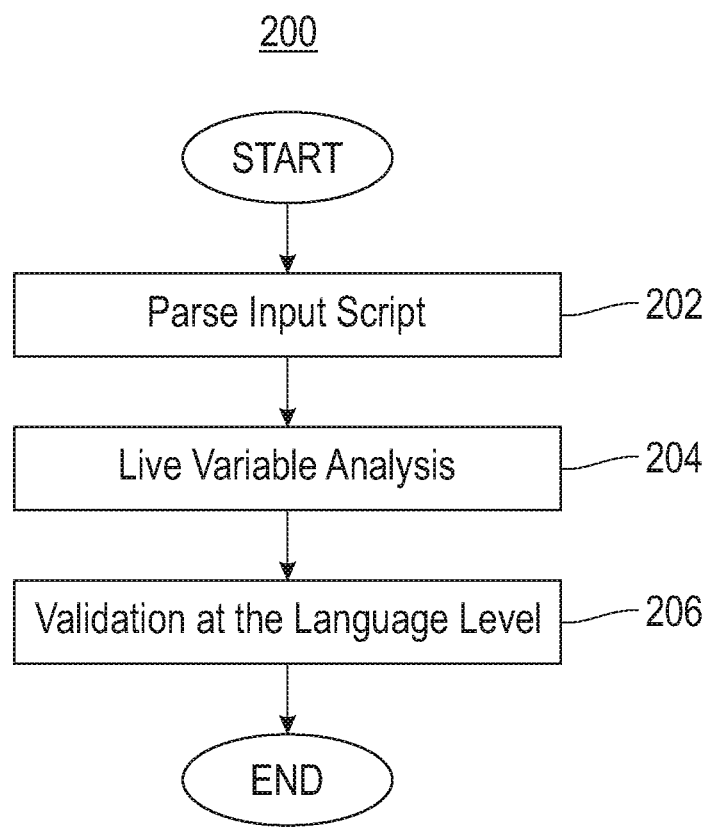
FIG. 2 depicts a flowchart illustrating a process for performing a language-level phase of execution plan compilation.

The optimization objective through the architecture of the layers shown herein is to minimize script execution time under hard memory constraints based on a cluster configuration (e.g., memory budget of driver and distributed tasks). Details of the compilation process performed by the system will now be described herein with reference to FIGS. 2-5. Referring to FIG. 2, a flowchart (200) is provided illustrating a process performed at the language-level layer during compilation of an execution plan. The language layer of the compilation chain represents the language-level phase. During the language-level phase, an input script associated with a machine-learning (ML) program is parsed into a hierarchical representation of statement blocks and statements (202). Statement blocks are defined by the program structure in terms of control flow constructs, such as branches, loops, or calls to user defined functions. This parsing is responsible for lexical and syntactic analysis and basic order of operations. In one embodiment, a parser generator creates the parser based on specific declarative machine learning language (DML) grammar.

After the parsing at step (202), a live variable analysis (204) takes place in terms of data flow and analysis over statement blocks. In one embodiment, the analysis (204) includes obtaining livein and liveout variable sets in a forward and backward pass over the entire program.

Following the analysis at step (204), validation at the language level takes place (206). More specifically, the validation includes a semantic analysis of the program and its expressions. The validation (206) is inherently ML domain specific. Examples for expression validation include, but are not limited to, compatibility checks of dimensions and mandatory parameters of built in functions. Similarly, in one embodiment, the validation takes place in a single pass over the entire program where statement blocks, statements, and expression are recursively validated.

Figure 3:
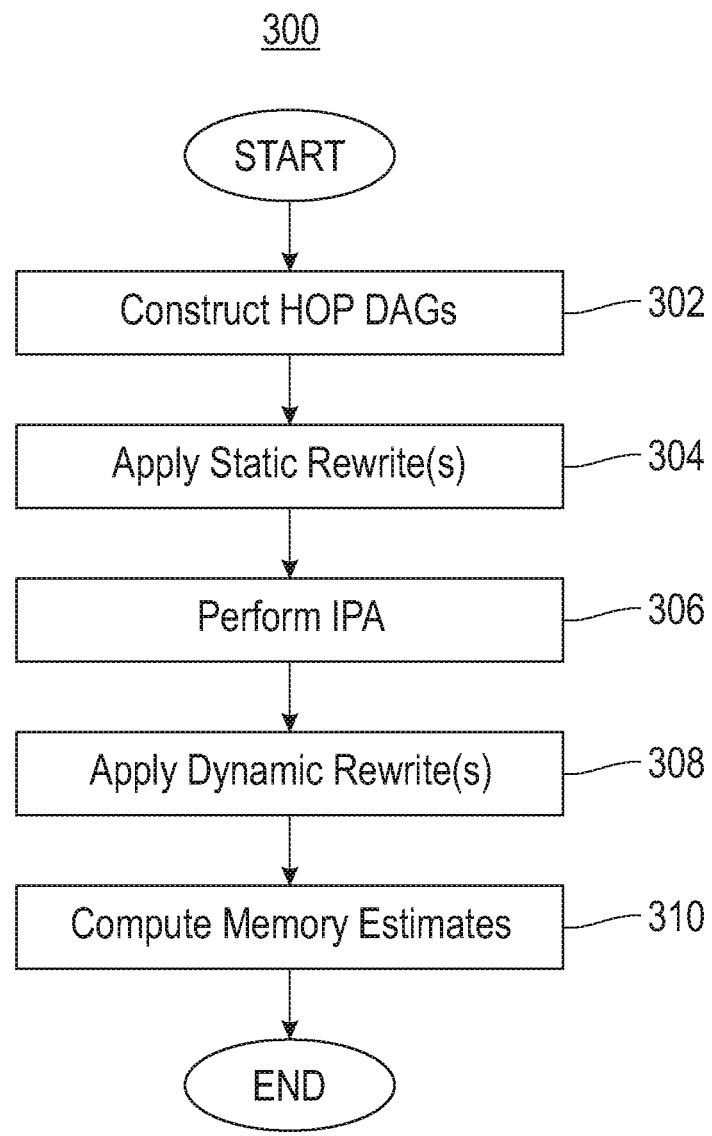
FIG. 3 depicts a flowchart illustrating a process for performing a HOP-level phase of execution plan compilation.

With reference to FIG. 3, a flowchart (300) is provided illustrating a process performed at the HOP-level layer during compilation of an execution plan. The HOP-level layer represents the HOP-level phase. During the HOP-level phase, for each basis block of statements, i.e. predicates and last-level statement blocks, DAGs of high-level operators are constructed (302), with nodes representing logical operations and their outputs, and edges representing data dependencies. The constructions at (302) may include, for example, a recursively constructed single operator tree for all statements and expressions of a statement block. After all DAGs have been constructed, and in one embodiment, one or more static HOP DAG rewrites may be applied (304). Static HOP DAG rewrites comprise all program and HOP DAG transformations that are independent of data size information (e.g., matrix dimensions and sparsity). Examples of the rewrites include, but are not limited to, format conversions, common sub-expression elimination, constant folding, algebraic simplifications, and branch removal.

Following completion of the rewrites at step (304), an intra/inter procedural analysis (IPA) is performed (306). This analysis includes propagation of size information over the rewritten program structure and into functions. In one embodiment, sizes are only propagated into functions if they are called with consistent sizes of arguments. Further details with respect to the IPA will be provided below with reference to FIG. 6.

Following the analysis at step (306), and in one embodiment, one or more dynamic HOP DAG rewrites are applied (308). These rewrites include simplifications that are beneficial but limited to size conditions, and cost-based rewrites that require sizes for cost estimation. Based on the propagated sizes at step (306), memory estimates for all operators are computed (310). These estimates reflect memory consumption of the HOPs with regard to in-memory execution in control program. Any memory estimates inherently need to reflect the underlying runtime. In a single node runtime, a multi-level buffer pool may control in-memory objects, and runtime instructions pin the inputs and outputs in memory. This pinning prevents serialization in operations like matrix multiplication that access data multiple times or out-of-order. To prevent out-of-memory situations, the computed memory estimate must not be an underestimation. Accordingly, in one embodiment, the memory estimate is a worst-case memory estimate.

The memory estimate may be computed at step (310) by recursively starting at leaf nodes (e.g., reads and literals) based on respective leaf node statistics. In one embodiment, if the sparsity is unknown, a dense worst-case estimate is used. The memory estimate computation proceeds to computing estimates for all non-leaf HOPs, after which operation memory estimates are computed using the sum of all child outputs, intermediates, and the output estimate. For example, the operation memory estimate of a binary operator for cell-wise matrix addition would include the output memory of both inputs and its own output. During this process, the worst-case sparsity and dimensions are propagated according to the operator semantics. For example, for a $[m \times k, s_1] \times [k \times n, s_2]$ matrix multiplication, a worst-case sparsity estimate of $s_3 = \min(1, s_1 k) \cdot \min(1, s_2 k)$ may be used, although the average case estimate would be $s_3 = 1 - (1 - s_1 s_2)^k$, and the output dimension can be exactly determined as $[m \times n]$. Additionally, size constraints may be backtracked. For example, for row-wise left indexing into a matrix R, the input matrix size is known to be of size $[1 \times ncol(R)]$. Finally, these memory estimates may be used for all in-memory matrices, matrix blocks, and operations over all of them.

As discussed above, there are two categories of rewrites that may be performed at the HOP-level phase, including static and dynamic. A static rewrite is size independent, and a dynamic rewrite is size dependent. Both categories of rewrites are applied at the HOP level to enable reuse across runtime backends. Examples of static rewrites that may be applied at step (304) include, but are not limited to, format conversions, common sub-expression elimination, constant folding, static algebraic simplifications, and branch removal. Examples of dynamic rewrites that may be applied at step (308) include, but are not limited to, matrix multiplication chain optimization and dynamic algebraic simplifications.

Figure 4:
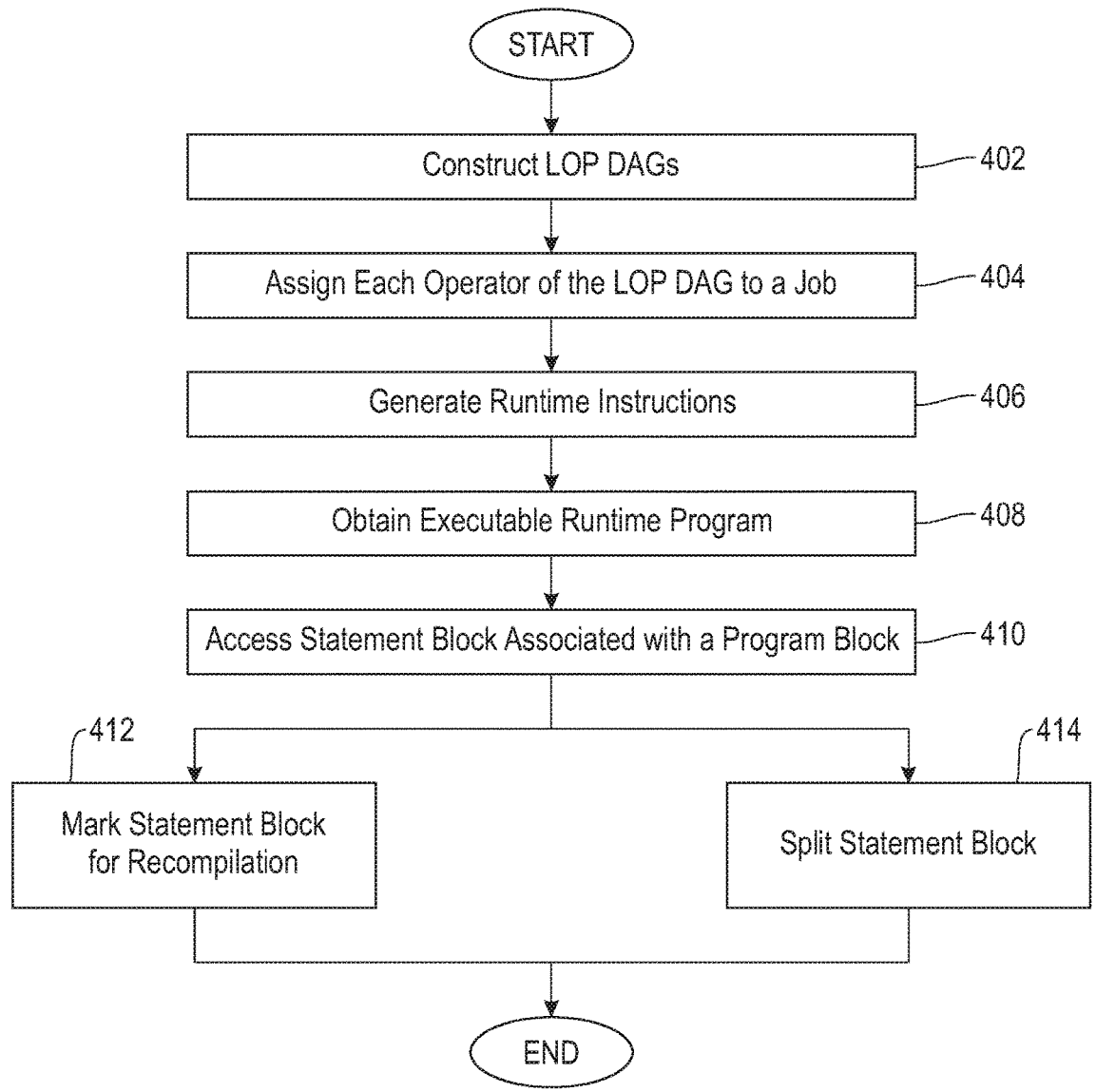
FIG. 4 depicts a flowchart illustrating a process for performing a LOP-level phase and a runtime-level phase of execution plan compilation.

With the rewritten HOP DAGs and computed memory estimates, all preconditions for runtime plan generation are available. The compilation process may now move to generating runtime plans based on the HOP DAGs. With reference to FIG. 4, a flowchart (400) is provided illustrating a process performed at the LOP-level and runtime layers during compilation of an execution plan. The LOP-level layer represents the LOP-level phase, and the runtime layer represents the runtime phase. During the LOP-level phase, LOP DAGs are constructed for all HOP DAGs (402). Specifically, a compiler uses a recursive traversal to perform the construction. In one embodiment, the construction at step (402) includes execution type selection (e.g., CP/MR/Spark) and physical operator selection (e.g., for matrix multiplication in MR: mapmm, mapmmchain, tsmm, pmm, cpmm, and/or rmm).

In one embodiment, a node of the HOP DAG is marked for recompilation during LOP DAG construction at step (402). For example, a node may be marked for recompilation whenever a conservative operator, such as an MR operator, is selected due to unknown size or sparsity. In practice, this means that most HOP DAGs that include at least one MR job are marked for recompilation. This is advantageous because the large latency of an MR job or disk I/O makes re-compilation overhead negligible. Thus, marking a HOP DAG for recompilation may be part of operator selection during the LOP DAG construction process.

In one embodiment, the marked HOP DAG is associated with a function comprising one or more loops, and the marking includes marking the function as a recompile-once function. This is performed on function entry to the entire function body to prevent unnecessary repeated recompilation of last-level HOP DAGs inside loop bodies.

Once the LOP DAG construction at step (402) is complete, the process proceeds to the runtime phase. Each operator of the LOP DAG is assigned to a job based on one or more constraints (404). In one embodiment, the assignment at step (404) includes piggybacking multiple operators into a minimal number of jobs. As is known in the art, piggybacking may be done via a greedy bin packing algorithm, and the one or more constraints may include job type compatibility, map/reduce execution location, matrix block alignment, and memory constraints.

The runtime program is generated (406). This phase of compilation includes the generation of executable program blocks per statement block and instructions for each operator. Following step (406), an executable runtime program is obtained (408). During runtime, HOP DAGs may be dynamically recompiled, if necessary. Specifically, prior to executing the compiled execution plan, the statement block associated with a program block is accessed (410).

In one embodiment, following the access of the statement block at step (410), the process may proceed to marking the statement block for recompilation (412). The marking at step (412) translates into marking the corresponding HOP DAG for recompilation. Accordingly, the function of the marking at step (412) is to identify the corresponding HOP DAG for recompilation during run-time.

In another embodiment, following the access of the statement block at step (410), the process may proceed to split the statement block into two or more statement blocks (414). Splitting, as known in the art, is a process performed to decompose a large DAG into smaller DAGs. The split at step (414) may include collecting operators and inputs, replacing the collection with transient reads, and placing the replacement into a new statement block inserted just before the original one. Each "cut" of the split statement block constitutes a recompilation point. In one embodiment, an optimizer may determine that the statement block should be split at step (414).

A major goal is to keep DAGs as large as possible to exploit all piggybacking opportunities. Thus, a very conservative approach may be followed with respect to splitting. In one embodiment, the statement block is split if it is determined that the corresponding HOP DAG is associated with persistent reads with unknown sizes (e.g., no relevant size metadata) or specific data-dependent operations (e.g., table), where the output dimensions are unknown until potentially all input data has been seen. Accordingly, no HOP DAGs are split by default.

Figure 5:
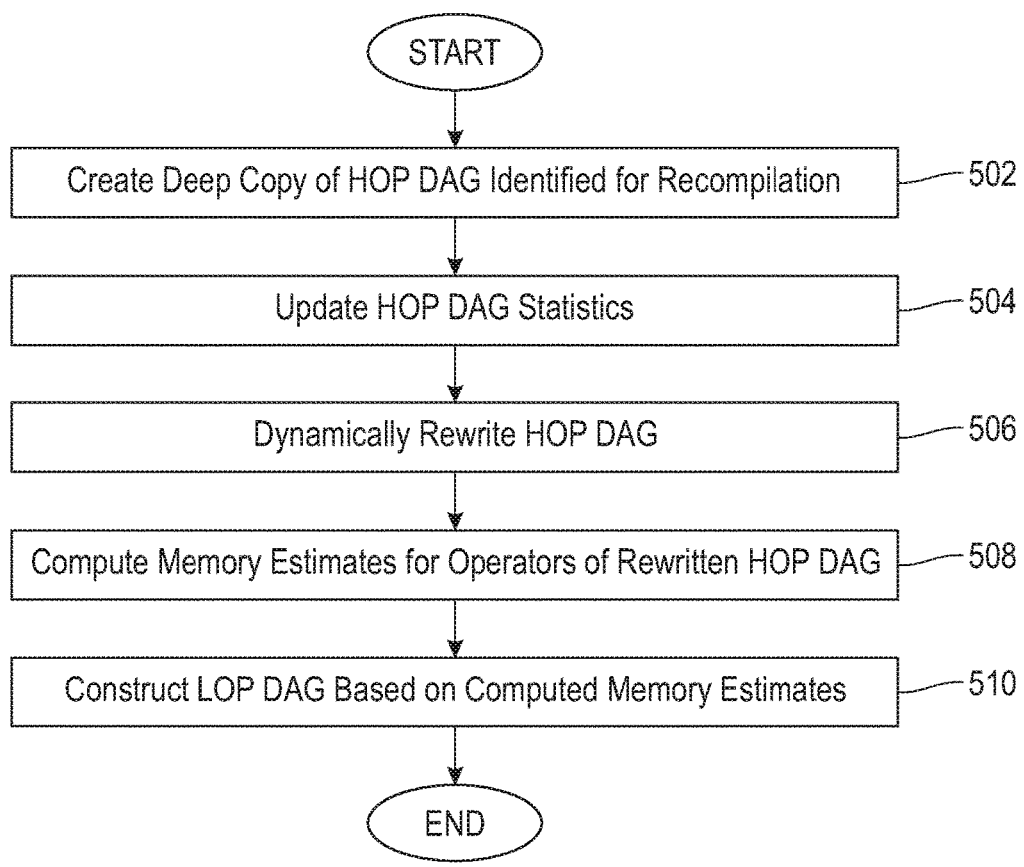
FIG. 5 depicts a flowchart illustrating a process for dynamically recompiling an execution plan during runtime.

Steps (412) and (414) may each be viewed as a process to create or generate recompilation points within a statement block. These points are used to identify if the HOP DAG corresponding to the statement block should be dynamically re-compiled during run-time. Referring now to FIG. 5, a flow chart (500) is provided illustrating a process for performing a dynamic re-compilation. In one embodiment, a deep copy of the identified HOP DAG is created (502) in order to apply non-reversible dynamic rewrites, while keeping the original HOP DAG for later re-compilations. Additional deep copies of the original program may also permit concurrent re-compilation among parallel workers without thread contention.

Statistics associated with the identified HOP DAG are updated (504). In one embodiment, the statistics updated at step (504) comprise leaf node statistics associated with a current symbol table. Specifically, the leaf node statistics are recursively propagated bottom-up through the identified HOP DAG, and each HOP of the HOP DAG updates its output statistics according to its input statistics and semantics.

In one embodiment, the updated statistics include size information propagated by an intra/inter-procedural analysis (IPA). The size information may include matrix dimension(s) and sparsity. In one embodiment, input sizes of reads are given by metadata for sparse matrix formats.

Figure 6:
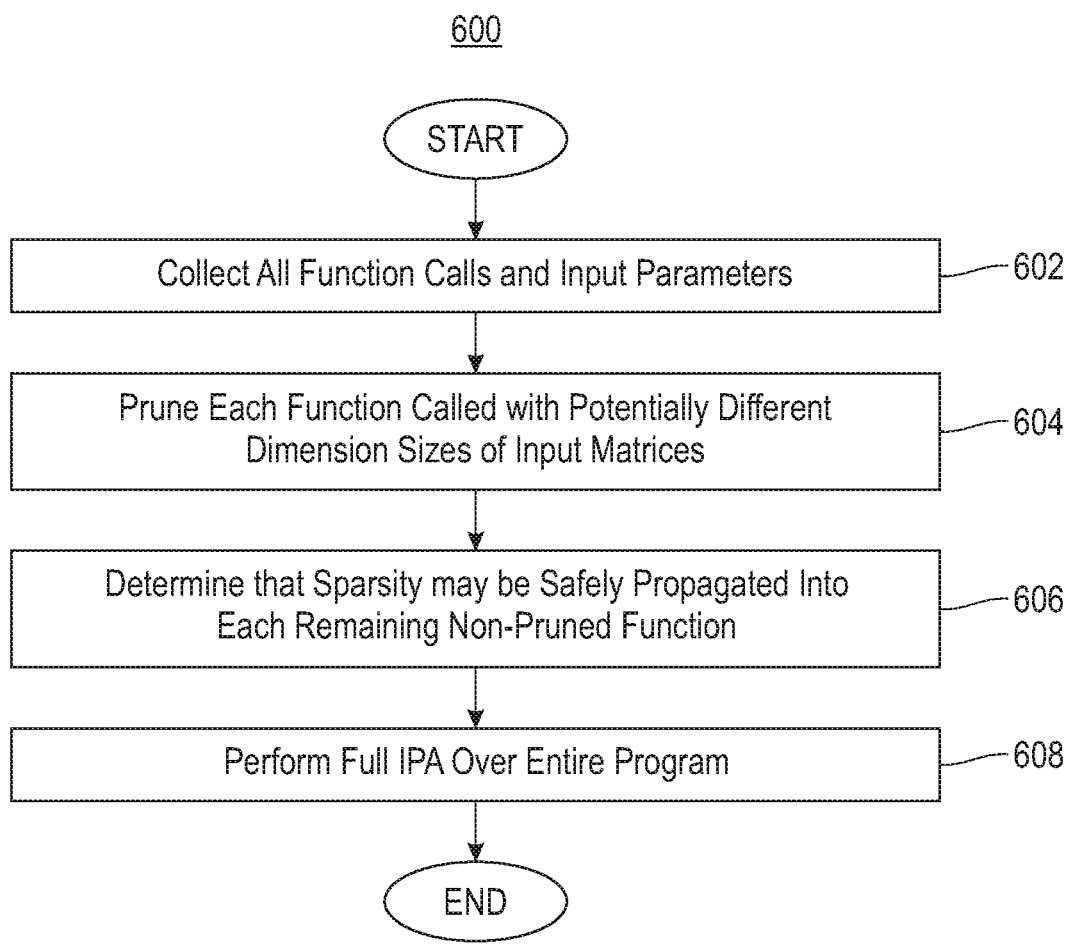
FIG. 6 depicts a flowchart illustrating a process for performing an intra/inter procedural analysis.

With reference to FIG. 6, a flowchart (600) is provided illustrating a process for performing an IPA. In one embodiment, the IPA implements a candidate-based algorithm. IPA candidate functions are determined by collecting all function calls and their input parameters (602). Each function that is called with potentially different dimension sizes of input matrices are pruned (604). It is determined that sparsity may be safely propagated into each remaining non-pruned function (606). A full IPA is performed over the entire program (608).

In one embodiment, step (608) includes iterating over a hierarchy of statement blocks. For example, for each statement block, input variable sizes are pushed into DAG leaf nodes, a bottom-up recursive propagation is performed through HOP DAG, and the resulting variables of the HOP DAG are extracted. The IPA performed at step (608) provides special care to conditional control structures. For example, with respect to "if" conditions, the size of a variable is propagated if both branches lead to the same size. Furthermore, for loops, unknown sizes are re-propagated into the loop body if it is determined that sizes change in the loop body. Whenever a function call is marked as an IPA candidate, sizes are recursively propagated into the function, and the IPA is continued with the resulting function output sizes.

Referring back to FIG. 5, the HOP DAG is dynamically rewritten (506). In one embodiment, the HOP DAG is dynamically rewritten at step (506) by modifying one or more operations of the identified HOP DAG based on attributes of intermediate results. The attributes may include, for example, size and sparsity. The dynamic HOP DAG rewrites are size-dependent rewrites that include (1) simplifications that are beneficial but only apply under certain size conditions and (2) rewrites that require cost estimation based on size. The modification may include one or more of the following: removing one or more operations or sub-DAGs known to produce an empty result (e.g., for C=A %*% B with nnz(A)=0, replacing C with an empty matrix and removing all operations that lead to A or B and only used by C), removing one or more unnecessary operations (e.g., removing indexing operations if the range matches the dimensions), simplifying a group of operations or fusing operations (e.g., replacing a group of operations with another group of operations that perform fewer computations or create fewer and/or smaller intermediaries), and converting one or more operations into a sparsity-exploiting operation for selective computation (e.g., $\Sigma(W*(X-U \%*\% t(V))^2)$ would create multiple dense intermediates in the dimension of the sparse input X, so rewriting this to a custom wsloss operator allows for selective computation over non-zero entries in W and X without computing/materializing other unnecessary entries).

Specific examples of dynamic rewrites that may be performed at step (506) include, for example, matrix multiplication chain optimization and dynamic algebraic simplification. The matrix multiplication chain optimization computes a cost-optimal composition of sub-chains, and composes an overall chain. The dynamic algebraic simplification rewrites are designed to remove unnecessary indexing operations, simplify aggregates, remove empty operators, and/or simplify vector operations (e.g., matrix multiplication).

Based on the updated statistics and rewritten HOP DAG, memory estimates are computed for all the operators of the rewritten HOP DAG (508). The computation at step (508) is similar to the computation described above in FIG. 3. Now that the HOP DAG has been dynamically rewritten and associated memory estimates have been computed, a LOP DAG corresponding to the rewritten HOP DAG is constructed based in part on the computed memory estimates (510). Following the construction at step (510), runtime instructions may be generated and an executable runtime program may be obtained from the generated runtime instructions, as discussed above in FIG. 4 (e.g. steps 402-406).

The dynamic recompilation process of FIG. 5 is a robust fallback strategy utilized whenever it is not possible to propagate size or sparsity during initial compilation. It is important to recompile HOP DAGs, as necessary, due to high latency of unnecessary MR jobs and high impact of selecting the right physical operators on large data. In one embodiment, language-level compilation requires about 200 ms per script and HOP-level compilation takes about 10 ms per DAG, while recompilation is designed to be less than 1 ms per DAG, which is negligible given the 20 s latency of MR jobs and 100 ms latency of Spark jobs for distributed computation.

Figure 7:
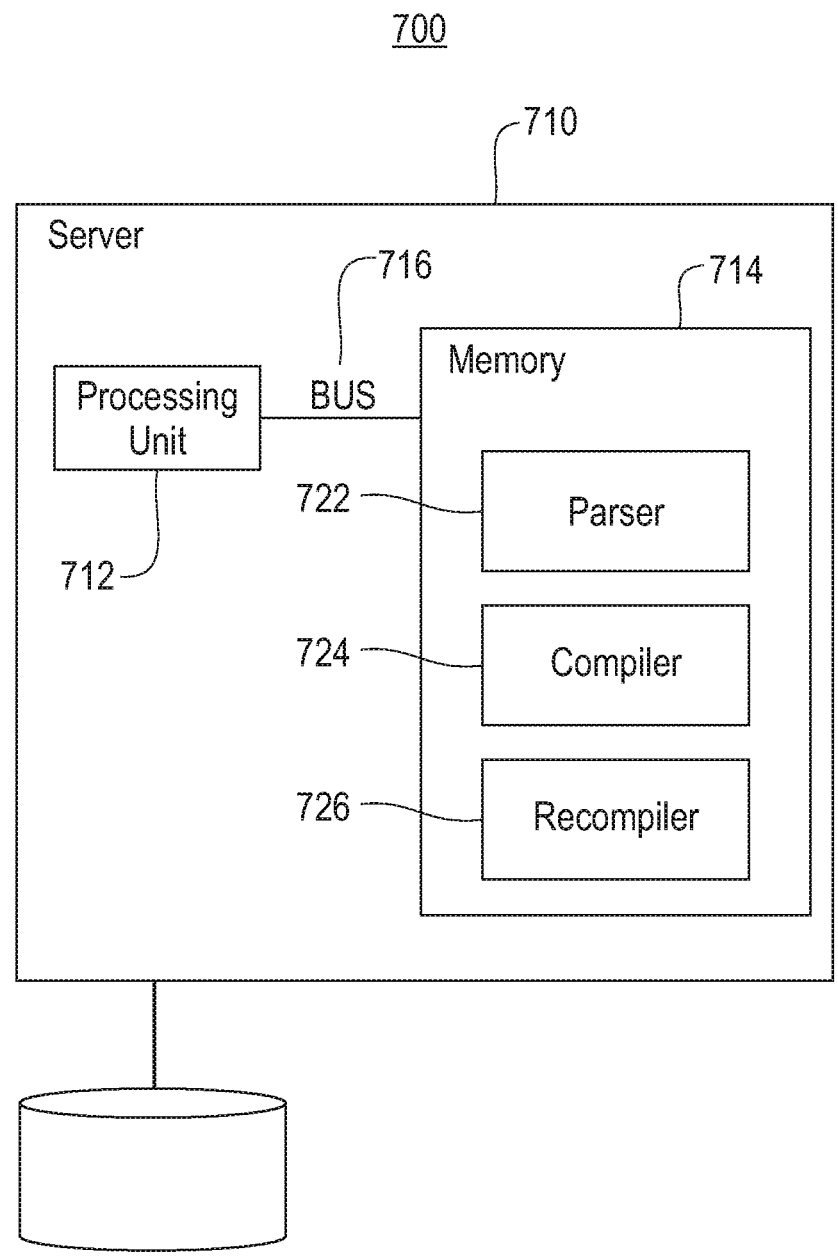
FIG. 7 depicts a block diagram illustrating tools embedded in a computer system for implementing the embodiments of FIGS. 1 and 2.

With reference to FIG. 7, a block diagram (700) is provided illustrating a data storage system for performing the processes described above in FIGS. 2-6. The data storage system may run on one or more servers (710) that include a processing unit (712) in communication with memory (714) across a bus (716).

A set of tools are provided in communication with the processing unit (712) to support data compression, including management of both data compression associated with data storage, and reading and writing the compressed data. In one embodiment, the tools include: a parser (722), a compiler (724), and a recompiler (726). During compilation of an execution plan of a machine-learning (ML) program, the parser (722) is provided to parse an input script associated with the ML program. The compiler (724) is provided to convert the parsed script into one or more directed acyclic graphs of high-level operators (HOP DAGs), to construct one or more directed acyclic graphs of low-level operators (LOP DAGS) corresponding to respective HOP DAGs, and to obtain an executable runtime program. In one embodiment, the parser (722) and compiler (724) are configured to perform the processes described above with reference to FIGS. 2-4. The recompiler (726) is provided to dynamically recompile the execution plan in response to identifying a HOP DAG for recompilation during compilation at runtime. In one embodiment, the recompiler is configured to perform the dynamic recompilation processes described above with reference to FIGS. 4 and 5.

As identified above, the parser (722), the compiler (724), and the recompiler (726), hereinafter referred to as tools, function as elements to support data compression. The tools (722)-(726) are shown in the embodiment of FIG. 7 as residing in memory (714) local to the data storage system (710). However, in alternative embodiments, the tools (722)-(726) may reside as hardware tools external to the memory (714), or they may be implemented as a combination of hardware and software. Similarly, in one embodiment, the tools (722)-(726) may be combined into a single functional item that incorporates the functionality of the separate items. As shown herein, each of the tools (722)-(726) are shown local to the data storage server (710). However, in one embodiment they may be collectively or individually distributed across a network or multiple machines and function as a unit to support execution plan compilation and recompilation. Accordingly, the tools may be implemented as software tools, hardware tools, or a combination of software and hardware tools.

Figure 8:
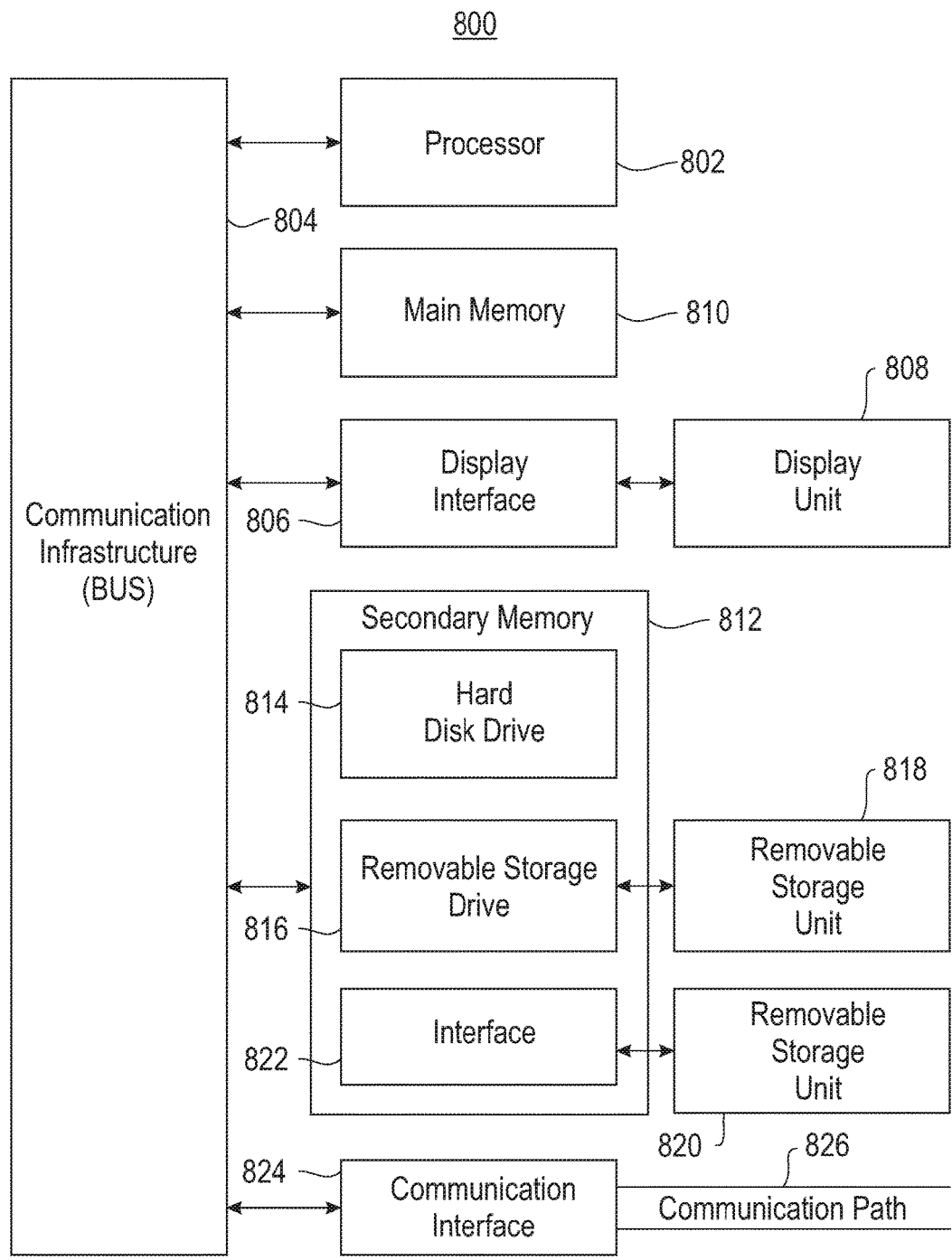
FIG. 8 depicts a block diagram showing a system for implementing the tools of FIG. 3.

With reference to FIG. 8, a block diagram (800) is provided illustrating an exemplary system for implementing the tools described above with reference to FIG. 8. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) is in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present embodiments as discussed herein. In particular, the computer programs, when run, enable the processor (802) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, a functional programming language or hybrid languages (object-oriented and functional), such as Scala, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
   converting a parsed input script into one or more directed acyclic graphs of high-level operators (HOP DAGs);
   constructing one or more directed acyclic graphs of low-level operators (LOP DAGs) corresponding to respective HOP DAGs;
   identifying a HOP DAG for recompilation during runtime;
   updating a statistic and rewriting an operator of the identified HOP DAG;
   recomputing a memory estimate of operators of the rewritten HOP DAG based on the updated statistic and rewritten operator;
   upon a determination that the rewritten HOP DAG is associated with a persistent read, the determination including producing a recompilation point identifying the HOP DAG should be dynamically recompiled, constructing a rewritten LOP DAG corresponding to the rewritten HOP DAG, wherein the construction is based in part on the recomputed memory estimate; and
   generating a runtime instruction based on the rewritten LOP DAG.

2. The method of claim 1, wherein constructing the one or more LOP DAGs further comprises marking a HOP DAG for recompilation, and wherein the marked HOP DAG is identified for recompilation during runtime.

3. The method of claim 2, wherein the identified HOP DAG is associated with a function comprising one or more loops, and further comprising marking the function as a recompile-once function.

4. The method of claim 2, wherein the marked HOP DAG includes one or more nodes and further comprising marking a node for recompilation upon selection of a conservative operator.

5. The method of claim 1, wherein the recompilation further comprises a dynamic recompilation performing a deep copy of the identified HOP DAG, and wherein the deep copy permits applying non-reversible dynamic rewrites and concurrent recompilation among parallel workers without thread contention.

6. The method of claim 1, wherein the rewrite comprises a dynamic rewrite modifying one or more operations of the identified HOP DAG based on attributes of intermediate results.

7. The method of claim 6, wherein the modification is selected from the group consisting of: removing one or more operations producing an empty result, removing one or more unnecessary operations, simplifying a group of operations, converting one or more operations into a sparsity-exploiting operation for selective computation, and combinations thereof.

8. The method of claim 7, wherein generating the runtime instructions comprises assigning each operator of the rewritten LOP DAG to a job based on one or more constraints, including piggybacking one or more operators of the rewritten LOP DAG into one or more composite jobs.

9. A computer program product comprising a computer readable hardware storage medium having computer readable program code embodied therewith, the program code being executable by a processor to:
   parse an input script;
   convert the parsed script into one or more directed acyclic graphs of high-level operators (HOP DAGs); and
   construct one or more directed acyclic graphs of low-level operators (LOP DAGs) corresponding to respective HOP DAGs; and
   identify a HOP DAG for recompilation during runtime;
   update a statistic and rewrite an operator of the identified HOP DAG;
   recompute a memory estimate of the rewritten HOP DAG based on the updated statistic and the rewritten operator;
   upon a determination that the rewritten HOP DAG is associated with persistent reads, the determination including producing a recompilation point identifying the HOP DAG should be dynamically recompiled, construct a rewritten LOP DAG corresponding to the rewritten HOP DAG, wherein the construction is based in part on the recomputed memory estimate; and
   generate runtime instructions based on the rewritten LOP DAG.

10. The computer program product of claim 9, wherein constructing the one or more LOP DAGs further comprises program code to mark a HOP DAG for recompilation, and wherein the marked HOP DAG is identified for recompilation during runtime.

11. The computer program product of claim 9, wherein the recompilation further comprises a dynamic recompilation program code to perform a deep copy of the identified HOP DAG, and wherein the deep copy permits concurrent recompilation among parallel workers without thread contention.

12. The computer program product of claim 9, wherein the rewrite comprises a dynamic rewrite program code to modify one or more operations of the identified HOP DAG based on attributes of intermediate results, and wherein the modification is selected from the group consisting of: removing one or more operations producing an empty result, removing one or more unnecessary operations, simplifying a group of operations, converting one or more operations into a sparsity-exploiting operation for selective computation, and combinations thereof.

13. The computer program product of claim 9, wherein generating the runtime instructions comprises program code to assign each operator of the rewritten LOP DAG to a job based on one or more constraints, including program code to piggyback one or more operators of the rewritten LOP DAG into one or more composite jobs.

14. The computer program product of claim 10, wherein the marked HOP DAG includes one or more nodes and further comprising marking a node for recompilation upon selection of a conservative operator.

15. A system comprising:
a hardware processing unit in communication with memory, the hardware processing unit to:
  parse an input script associated with a machine-learning program;
  convert the parsed script into one or more directed acyclic graphs of high-level operators (HOP DAGs);
  construct one or more directed acyclic graphs of low-level operators (LOP DAGs) corresponding to respective HOP DAGs; and
  identify a HOP DAG for recompilation during runtime;
  update a statistic and rewrite an operator of the identified HOP DAG;
  recompute a memory estimate of the rewritten HOP DAG based on the updated statistic and rewritten operator;
  upon a determination that the rewritten HOP DAG is associated with persistent reads, the determination including producing a recompilation point identifying the HOP DAG should be dynamically recompiled, construct a rewritten LOP DAG corresponding to the rewritten HOP DAG, wherein the construction is based in part on the recomputed memory estimate; and
  generate runtime instructions based on the rewritten LOP DAG.

16. The system of claim 15, wherein constructing the one or more LOP DAGs further comprises the hardware processing unit to mark a HOP DAG for recompilation, and wherein the marked HOP DAG is identified for recompilation during runtime.

17. The system of claim 15, wherein the recompilation further comprises a dynamic recompilation, the hardware processing unit to perform a deep copy of the identified HOP DAG, and wherein the deep copy permits concurrent recompilation among parallel workers without thread contention.

18. The system of claim 15, wherein the rewrite comprises a dynamic rewrite, the hardware processing unit to modify one or more operations of the identified HOP DAG based on attributes of intermediate results, and wherein the modification is selected from the group consisting of: removing one or more operations producing an empty result, removing one or more unnecessary operations, simplifying a group of operations, converting one or more operations into a sparsity-exploiting operation for selective computation, and combinations thereof.

19. The system of claim 15, wherein generating the runtime instructions comprises the hardware processing unit to assign each operator of the rewritten LOP DAG to a job based on one or more constraints, including the hardware processing unit to piggyback one or more operators of the rewritten LOP DAG into one or more composite jobs.

20. The system of claim 16, wherein the marked HOP DAG includes one or more nodes and further comprising marking a node for recompilation upon selection of a conservative operator.

* * * * *